United States Patent

[11] 3,616,099

| [72] | Inventors | Victor Shanok;<br>Jesse P. Shanok, both of Brooklyn, N.Y. |
|---|---|---|
| [21] | Appl. No. | 760,919 |
| [22] | Filed | Sept. 19, 1968 |
| [45] | Patented | Oct. 26, 1971 |
| [73] | Assignee | Glass Laboratories Company |

[54] COMPOSITE STRIP OF METALLIC FOIL CORE ENCASED WITHIN IONOMER RESIN AND HAVING A CLEAR FACING STRIP
5 Claims, 5 Drawing Figs.

[52] U.S. Cl..................................................... 161/5,
161/6, 161/43, 161/175, 161/213, 161/413
[51] Int. Cl........................................................B32b 15/08,
B44f 9/02
[50] Field of Search............................................ 161/1, 5, 6,
18, 43, 106, 175, 213, 413; 260/DIG. 31

[56] References Cited
UNITED STATES PATENTS

| 3,226,287 | 12/1965 | Shanok et al. | 161/216 X |
| 2,987,103 | 6/1961 | Yakubik | 154/25 |
| 3,138,834 | 6/1964 | Shanok et al. | 20/74 |
| 3,245,864 | 4/1966 | Shanok et al. | 161/106 |
| 3,355,319 | 11/1967 | Rees | 117/122 |
| 3,452,861 | 7/1969 | Erwin | 206/59 |

OTHER REFERENCES

Encyclopedia of Polymer Science and Technology " Ionomers," Vol. 6, page 420, Copyright 1967 by John Wiley & Sons, Inc.

*Primary Examiner*—John T. Goolkasian
*Assistant Examiner*—M. E. McCamish
*Attorney*—Friedman & Goodman ABSTRACT: An improved composite decorative strip comprising a core member encapsulated within a shell of transparent thermoplastic material which is extruded thereover, said core member further comprising a metal foil member, said thermoplastic further comprising an ionomer resin.

VICTOR SHANOK
JESSE P. SHANOK

INVENTORS

BY Friedman & Goodman

Attorneys

COMPOSITE STRIP OF METALLIC FOIL CORE ENCASED WITHIN IONOMER RESIN AND HAVING A CLEAR FACING STRIP

BACKGROUND OF THE INVENTION

1. Field of the Invention

The invention relates to a composition decorative trim strip particularly adaptable for disposition in a composite or nonflat position, e.g. arcuate

2. Description of the Prior Art

In the art of forming decorative trim strips it is, of course, well known to provide a thin ribbon or tape of metal foil encased within a smooth-surfaced, transparent thermoplastic material which may be disposed in a variety of flat arcuate positions, the thermoplastic material assuming a set so that it will remain in the desired position. With such as assembly, the transparent thermoplastic material will expose the metal foil to view, thereby providing the strip with the appearance of a highly polished metal finish.

One thermoplastic material that has been employed, as aforesaid, is cellulose acetate butyrate. However, a number of problems have existed therewith in the prior art. For one, it has been found that flexure of the strip longitudinally is resilient so that there is a strong tendency to recover from any deformed state in many instances, imposing substantial limitations on its use. Another, even more serious problem encountered, is the tendency of the metal foil embedded in the thermoplastic material to craze or to crack when the strip is bent to its desired arcuate position. This crazing or rupturing of the metallic foil, of course, renders the composite strip totally unsuitable for use as a decorative trim strip. While coating of the foil with a transparent vinyl plastic material, or providing a soft resilient core of this material, has been tried to some advantage to overcome the aforementioned problems, still it would be much simpler and more economical if these intermediate materials could be eliminated from the trim strip.

SUMMARY OF THE INVENTION

It is, therefore, among one of the principal objectives of the invention to provide an improved decorative trim strip employing a metallic foil core member encased in a transparent plastic material and being capable of flexure without substantial risk of rupturing the metallic foil core.

In accordance with the present invention this objective is achieved by employing a new thermoplastic polymer heretofore unknown for the encapsulation of metallic foil to form decorative trim strips. This new thermoplastic material, now commercially available, has been given the generic term "ionomer" resin. This ionomer material is clear as glass, but far tougher. Until the discovery of the ionomer resin, no practical method had been found to link long chain polymers, but now it has been found that metal ions can cause this linkage.

These interchain links in the ionomer, unlike the covalent bonds in a cross-linked polyethylene, for example, are mobile and transfer with heating, permitting melt fabrication to be carried out by current conventional extrusion techniques. The polymers exhibit exceptional strength in the melt, the melt processing range being f from 290° to 600° F. The typical properties of various grades of ionomer resins are given in the table hereinbelow.

TYPICAL PROPERTIES OF IONOMER RESINS

| Property | ASTM test | General purpose film grades | Industrial film grades | Extrusion coating grades | Laminating grades | Sheet and slow molding grades | General purpose molding grades | High clarity molding grades | Electrical grades |
| --- | --- | --- | --- | --- | --- | --- | --- | --- | --- |
| Molecular weight range | | High | Very high | High | Very high | High | Medium | Medium | Very high |
| Melt flow index, dgm./min | D-1238 | 1.0-2.0 | 25-4.0 | 1.0-2.5 | 1.5-2.5 | 0.5-1.0 | 1.0-10.0 | 5.0 | 0.5-4.0 |
| Specific gravity | D-792 | 0.94 | 0.95 | 0.94 | 0.95 | 0.94 | 0.94 | 0.95 | 0.96 |
| Density, lb./cu. in. | | (*) | (*) | (*) | (*) | 0.0345 | 0.0340 | 0.0343 | 0.0345 |
| Area yield, sq. in./lb. at 1 mil | | 29,500 | 29,200 | 29,500 | 29,200 | 29,200 | (*) | (*) | (*) |
| Toughness: | | | | | | | | | |
| Izod impact strength, ft. lbs./in. of notch | D-256 | (*) | (*) | (*) | (*) | 6-10 | 10-14 | 8-12 | (*) |
| Tensile impact, ft. lbs./in | D-1822 | 350 | (*) | (*) | (*) | 300 | 400 | 400 | (*) |
| Brittleness temp., °F | D-746 | -193 | -200 | -193 | -202 | -211 | -132 | -156 | -220 |
| Dart drop (26″), gm./mil | D-1709 | 400 | 200 | (*) | 300 | (*) | (*) | (*) | (*) |
| Elmendorf Tear, gm./mil | D-1922 | 20 | 150 | (*) | 100 | 100 | (*) | (*) | (*) |
| Mechanical: | | | | | | | | | |
| Tensile strength, M p.s.i | D-638 | 5.0 | 4.0 | 4.8 | 4.0 | 4.5 | 3.4 | 4.2 | 3.8 |
| Stiffness, M p.s.i | D-747 and D-882 | 30 | 29 | (*) | 22 | 50-80 | 25 | 35 | 22 |
| Yield strength, M p.s.i | D-412 | 1.8 | 1.8 | 2.4 | 1.8 | 2.3 | 1.6 | 2.0 | 2.4 |
| Elongation, percent | D-412 | 450 | 450 | 400 | 450 | 350 | 400 | 350 | 450 |
| Hardness (Shore) D scale | D-785 | 60 | 54 | (*) | 55 | 60 | 56 | 59 | (*) |
| Optical: | | | | | | | | | |
| Refractive index | D-542 | 1.51 | (*) | (*) | (*) | 1.51 | 1.51 | 1.51 | (*) |
| Haze, percent (flat film, 1.25 mil) | D-1003 | <1.0 | 8.0 | <1.0 | 2.0 | <1.0 | (*) | (*) | (*) |
| Haze, percent ¼ in. molding | | (*) | (*) | (*) | (*) | 3 | 17 | 4 | (*) |
| Haze, percent ½ in. molding | | (*) | (*) | (*) | (*) | 7 | 55 | 10 | (*) |
| Transmission, percent at 546 mμ | D-1746 | | | | | | | | |
| 5 mil sheet | | 96-98 | (*) | 96-98 | 96-98 | 98 | (*) | (*) | (*) |
| 125 mil sheet | | (*) | (*) | (*) | (*) | 85-75 | 60 | 75-85 | (*) |
| Transmission range, at 10 mil, mμ | | 300-1200 | (*) | (*) | (*) | 300-1200 | (*) | 300-1200 | (*) |
| Electrical: | | | | | | | | | |
| Vol. res. (dry) ohms-cm | D-257 | 1×10^14 | (*) | (*) | 1×10^18 | (*) | 1×10^16 | (*) | 1×10^16 |
| Dielectric const., 100 kc. and 1 mc. | D-150 | 2.4 | (*) | (*) | 2.4 | (*) | 2.4 | (*) | 2.36 |
| Dielectric strength, v./mil, 1″ electrodes in oil. | D-149 | | | | | | | | |
| 30 mil | | 1,000 | (*) | (*) | 1,100 | (*) | 1,000 | (*) | 1,100 |
| 130 mil | | (*) | (*) | (*) | (*) | (*) | (*) | (*) | 485 |
| Power factor | D-150 | 0.003 | (*) | (*) | (*) | (*) | .003 | (*) | .003 |
| Dissipation factor, 100 kc and mc. | D-150 | 0.0030 | (*) | (*) | 0.0015 | (*) | .0030 | (*) | 0.0015 |
| Thermal: | | | | | | | | | |
| Heat deflection temp., °F. (66 p.s.i.) | D-648 | 113 | (*) | (*) | 110 | 114 | 112 | 108 | 110 |
| Vicat temp., °F | D-1525 | 168 | 170 | 142 | 170 | 160 | 168 | 142 | 171 |
| Coef. of therm. exp. (-4 to 90°F.) in./in./°C. ×10^8 | D-696 | 10-12 | (*) | (*) | (*) | 10-12 | 10-12 | 10-12 | 10-12 |
| Flammability, in./min | D-635 | 1.1 | (*) | (*) | 1.1 | 0.4 | 1.1 | 1.0 | 0.9 |
| Thermal conductivity, cal./cm.²/sec./°C/cm. | | | | | 5.8×10^4 | | | | |
| Specific heat, cal./gm./°C, 32-300° F. range. | | | | | .55 average | | | | |
| Chemical: | | | | | | | | | |
| Stress crack resistance, hrs | Time to 50% | | | | | | | | |
| 10% "Igepal" | Failure at 50° C | 300 | >1,000 | | >500 | 400 | 0-16 | >250 | >500 |
| 100% "Igepal" | | >1,000 | >1,000 | | >1,000 | >1,000 | 0-240 | >500 | >1,000 |
| Acids | D-570 | | | | Slow attack | | | | |
| Bases | D-570 | | | | High resistance | | | | |
| Hydrocarbons | D-570 | | | | Slight swell | | | | |
| Ketones, esters | D-570 | | | | Resistant | | | | |
| Permeability: | | | | | | | | | |
| WVIR, g./24 hrs./100 in.⁶/mil/ 100° F., 90% R11, creased. | D-96 | 1.5-2.0 | 1.5 | 2.0 | 1.4 | 1.4 | (*) | (*) | (*) |
| Oxygen, cc./24 hrs./100 in.⁶/mil | D-1434 | 400 | 300 | 300 | 300 | 300 | (*) | (*) | (*) |
| Vegetable oil, saturated | | | | | High resistance | | | | |
| Animal oil | | | | | High resistance | | | | |
| Mineral oil | | | | | Good resistance (below 120° F.) | | | | |

The sheet and blow molding grades and high clarity molding grades have been found to be particularly preferable for use in the composite strip of the invention.

The invention, then, provides an improved composite decorative trim strip comprising a core member encased within a shell of transparent thermoplastic material which is extruded thereover, said core member further comprising a metallic foil, said thermoplastic material further comprising an ionomer resin.

BRIEF DESCRIPTION OF THE DRAWING

The invention will be hereinafter more fully described with reference to the accompanying drawing in which.

DESCRIPTION OF THE PREFERRED EMBODIMENTS

Figure 1:
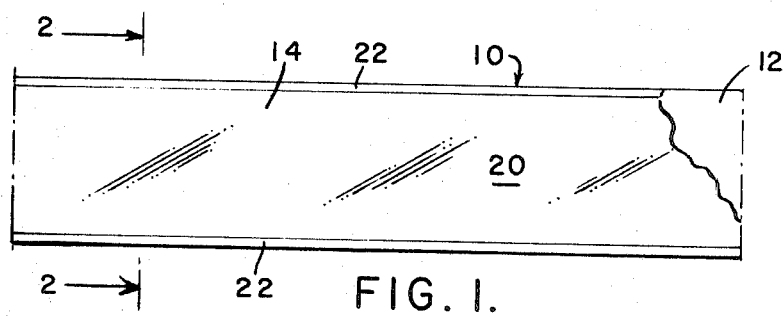
FIG. 1 is a top plan view of the invention strip with a portion broken away for purposes of illustration.
Figure 2:
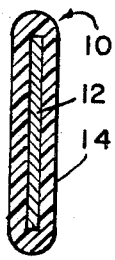
FIG. 2 is a sectional view taken along line 2—2 of FIG. 1.

Referring now to FIGS. 1 and 2 in detail, one embodiment of the invention comprises a continuous trim strip 10. The trim strip further comprises a metal foil core member 12 encapsulated within a shell 14 of transparent thermoplastic material known as aN ionomer resin, whose latter properties have been described in detail hereabove. Thus, the trim strip is longitudinally flexible, while being relatively rigid in its transverse dimension. Tee metallic foil core member 12 may be composed of aluminum, thereby imparting to the strip 10 the appearance of a highly polished chrome or silver strip material.

Additionally, for decorative value the upper face 20 of the ionomer resin shell 14 may be provided with raised, opposing longitudinal edges 22 during the extrusion process.

It is a particularly highly desirable advantage of the ionomer resin employed in the invention strips, that it may be used with conventional extrusion equipment and processes now extant, such as that described in our patent U.S. Pat. No. 3,245,864.

Figure 3:
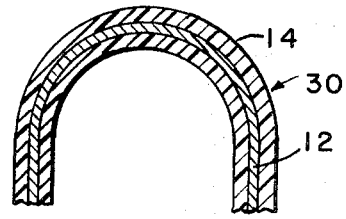
FIG. 3 is a sectional end view of a form of the invention strip in an arcuate condition.

Thus, according to one of the methods shown in the aforesaid patent, the trim illustrated in FIG. 3 of the present invention may be formed. As here shown in the trim strip 30 is in the arcuate from and comprises, as before, a core of metallic foil 12 and an encapsulating shell 14 of ionomer resin. The beauty of the invention composite strip is that because of its ionomer resin shell it may be bent any which way, and yet surprisingly, the metallic foil will not craze or rupture thus presenting at all times a highly decorative appearance.

Figure 4:
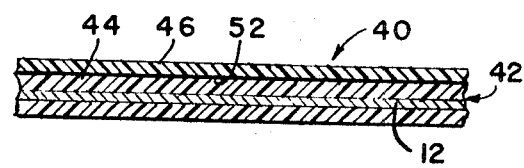
FIG. 4 is a cross-sectional view taken through a trim strip pursuant to a modification of the invention.
Figure 5:
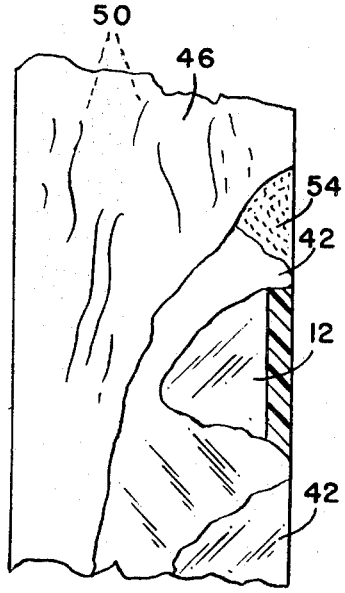
FIG. 5 is a top plan view of the strip illustrated in FIG. 4, with portions broken away for purposes of illustration.

FIGS. 4 and 5 illustrate yet another modification of the invention. Therein is shown a continuous trim strip 40. The trim strip 40 comprises an elongated base strip 42 formed of the aforementioned ionomer resin and having embedded therein a metallic foil core 12, as before.

However, in this instance, the extruded base strip 42 is preferably colored according to the particular type of wood which it will represent. For example, mahogany wood—reddish brown; walnut wood—brown; cherry wood—red; white oak—white. Consequently, it will be apparent that in order to simulate a variety of different decorative woods, all that is required is to maintain an inventory of base strips in accordance with the fundamental basic colors of the various woods to be simulated.

Each base strip 42 is provided with an elongated upper face 44 which is adapted to receive and mount a decorative facing strip 46. Facing strip 46 is formed of a suitable plastic material, preferably, plasticized polyvinyl chloride or copolymers thereof, and is in the form of a relatively thin film which is flexible as well as stretchable both longitudinally and laterally thereof. Facing strip 46 is clear and transparent and is provided with a suitable decoration, preferably, as here shown, a decoration 50, which gives the facing strip 46 the appearance of a wood surface. The decoration 50 is advantageously provided on facing strip 46 along the bottom surface 52 thereof, i.e., that abutting upper face 44 of base strip 42. Since the strip 46 is clear and transparent, it will be readily apparent that the decorative wood grain effect 50 is clearly visible through facing strip 46. The under surface 52 of the strip 46 is provided with a suitable adhesive coating 54 which is of the heat-sensitive or thermoplastic type, so that it may be softened and rendered relatively tacky by radiant heat emanating from the crosshead of the extrusion apparatus which is used to fabricate the decorative strip 40, or in any other convenient manner. The utilization of the metallic foil in combination with the woodlike effect created adds a highly novel and effective design aspect to the trim strip 40.

In view of the foregoing, it will be apparent that there has been illustrated and described a highly novel improved composite strip which will retain its metallic foil core member in smooth unbroken and uncrazed condition whether the trim strip is in the flat or nonflat state, and which will provide, if desired, a highly novel wood grain design effect.

We claim:

1. A trim strip comprising an elongated base strip having a predetermined color to simulate a particular type of decorative wood a metallic foil member forming a core for said base strip and being encased in said base strip, said trim strip being longitudinally flexible without substantial risk of rupturing said metallic foil member while being relatively rigid in its transverse dimension, said trim strip including resin means to prevent crazing and rupturing of said metallic foil member when said trim strip is bent to its desired position to thus present a highly decorative appearance at all times, said resin means comprising an ionomer resin, a clear decorative facing strip secured to said base strip along one longitudinally extending surface of said base strip, said facing strip being formed of a relatively flexible plastic material having a decorative pattern provided thereon along an inner surface thereof which is adjacent to said longitudinally extending surface of said base strip.

2. A trim strip according to claim 1, wherein said metallic foil is formed of aluminum, and said decorative pattern simulates a wood grain.

3. A trim strip according to claim 1 wherein an outer face of said trim strip is provided with raised opposing longitudinal edges.

4. A trim strip according to claim 1, wherein said facing strip is secured by an adhesive coating to the associated longitudinal surface of said base strip.

5. A trim strip according to claim 1, wherein said decorative pattern simulates a wood grain.